United States Patent [19]

Shapiro

[11] 3,713,857

[45] Jan. 30, 1973

[54] PHTHALOCYANINE PIGMENTS

[75] Inventor: Leonard Shapiro, East Brunswick, N.J.

[73] Assignee: Sun Chemical Corporation, New York, N.Y.

[22] Filed: Feb. 25, 1971

[21] Appl. No.: 118,943

[52] U.S. Cl. .............................. 106/288 Q, 106/309
[51] Int. Cl. .......................................... C08h 17/14
[58] Field of Search......... 106/288 Q, 309; 260/314.5

[56] References Cited

UNITED STATES PATENTS

| | | | |
|---|---|---|---|
| 2,367,519 | 1/1945 | O'Neal | 106/288 Q |
| 3,150,150 | 9/1964 | Brand | 260/314.5 |

*Primary Examiner*—James E. Poer
*Attorney*—Cynthia Berlow

[57] ABSTRACT

Organic pigments having improved heat stability and dispersibility are obtained by pasting the crude pigment with sulfuric acid in the presence of (a) a salt of an aromatic sulfonic acid or (b) free aromatic sulfonic acid plus sodium sulfate.

11 Claims, No Drawings

PHTHALOCYANINE PIGMENTS

This invention relates to the conditioning of organic pigments. More specifically it relates to a modified acid pasting process for conditioning pigments.

A number of methods have been employed for finishing crude organic pigments including salt grinding, acid swelling, and acid pasting. The most generally accepted of these has been acid pasting which involves dissolving the crude pigment in a concentrated acid and then drowning in water or an organic liquid.

It has now been found that organic pigments having improved properties can be obtained by pasting the crude pigment with sulfuric acid in the presence of a salt of an aromatic sulfonic acid or with the free sulfonic acid plus sodium sulfate.

The process of this invention results in a pigment product that has surprisingly improved heat stability which is of great importance in such product applications as the coloration of polyvinyl chloride and other similar polymeric materials.

In the general practice of this invention the crude pigment, dissolved in sulfuric acid, is mixed with the salt of an aromatic sulfonic acid and the mixture is then diluted with water. The thus-conditioned pigment is then recovered in any known and convenient manner, such as by filtering, decanting, centrifuging, or the like, and then washed to remove the salt.

The preferred salt for the pasting step of this invention is sodium alpha-naphthalene sulfonate. This can be used as such, or prepared in situ from stoichiometric proportions of alpha-naphthalene sulfonic acid and sodium sulfate.

The ratio of the total amount of acid to the amount of crude pigment may vary from about 5 to 12, and preferably from about 7 to 10, parts by weight of acid to one part of crude pigment.

The amount of total acid used in the process is in the range of about 5 to 12, and preferably about 7 to 10, parts by weight of acid to one part of sodium alpha-naphthalene sulfonate.

The process of this invention has resulted in products having excellent brightness, color strength, and tinting power as well as heat stability that is superior to that of pigments conditioned with free aromatic sulfonic acids.

Heat stability is measured by predispersing the pigment with dioctyl phthalate. A portion of the dispersion is placed in a suitable receptacle in a pre-heated oven at 350° F. and maintained at this temperature for 30 minutes. Equal amounts of both the heated and unheated portions of the dispersion are then separately incorporated into opaque vinyl sheeting by means of a heated two-roll mill; portions of each sheet are fused together with a hydraulic press and then inspected for color drift caused by the lack of stability toward heat.

The following examples further illustrate this invention. Unless otherwise indicated, all parts are given by weight.

EXAMPLE 1

A. 165 Parts of alpha-naphthalene sodium sulfonate was added to a stirred mixture of 153 parts of 98 percent sulfuric acid and 41.3 parts of 20 percent oleum at a temperature below about 40° C. 100 Parts of 98 percent sulfuric acid was then added to the resulting thick paste, and the mixture was stirred at ambient temperature overnight.

B. 120 Parts of copper phthalocyanine (92 percent pure) was added with stirring to 1,200 parts of 98 percent sulfuric acid. After stirring for 1 hour, the temperature was raised to 60° C. and held there for 4 hours; then the mixture was stirred at ambient temperature overnight.

C. The solution of part B was then added to the slurry of part A, and the mixture was stirred for 1 hour.

D. The mixture of part C was then added to 9,000 parts of water with efficient stirring at a temperature below 35° C. with ice addition as necessary. The resultant slurry was filtered and washed with water to a pH of 6. The pigment presscake was reslurried in 6,000 parts of water; a solution of 50 percent aqueous sodium hydroxide was added to a pH of 10–11; and the slurry was stirred for 1 hour, filtered, washed neutral with water, and finally dried at about 70° C. The product showed excellent heat stability as well as dispersibility in vinyl.

EXAMPLE 2

The procedure of Example 1 was repeated with sodium beta-naphthalene sulfonate instead of sodium alpha-naphthalene sulfonate. The heat stability of the product pigment was inferior to that of the product of Example 1.

EXAMPLES 3 – 6

The procedure of Example 1 was repeated with equivalent amounts of each of the following instead of sodium alpha-naphthalene sulfonate: alpha-naphthalene sulfonic acid, beta-naphthalene sulfonic acid, toluene sulfonic acid, and xylene sulfonic acid. In each case the heat stability of the resulting product pigment was inferior to that of the product of Example 1.

EXAMPLE 7

The procedure of Example 1 was repeated with an equivalent amount of a mixture of alpha-naphthalene sulfonic acid plus an equivalent weight of sodium sulfate instead of sodium alpha-naphthalene sulfonate. The product had vinyl heat stability and dispersibility that were comparable to those of the product of Example 1.

EXAMPLE 8

The procedure of Example 1 was repeated except that the copper phthalocyanine was slightly chlorinated (chlorine content 0.77 per cent). The results were comparable.

EXAMPLE 9

The procedure of Example 1 was repeated except that the copper phthalocyanine was more highly chlorinated (chlorine content 1.2 per cent). The product had inferior vinyl heat stability.

EXAMPLE 10

The procedure of Example 1 was repeated except that the crude pigment was dissolved in the sulfuric acid in the presence of the sodium alpha-naphthalene sulfonate. The results were comparable.

EXAMPLE 11

The procedure of Example 1 was repeated except that the crude pigment was dissolved in the sulfuric acid in the presence of an equivalent amount of a mixture of alpha-naphthalene sulfonic acid plus an equivalent weight of sodium sulfate. The results were comparable.

EXAMPLE 12

For comparative purposes the procedure of Example 1 was repeated using the sodium salt of the formaldehyde condensation product of naphthalene sulfonic acid (disclosed in U.S. Pat. No. 2,213,693) instead of sodium alpha-naphthalene sulfonate. The process could not be completed because on striking into water an unfilterable blue slurry was obtained.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for producing organic pigments having improved heat stability and dispersibility which comprises the steps of (1) dissolving the crude pigment in sulfuric acid in the presence of (a) the sodium salt of alpha-naphthalene sulfonic acid or (b) a mixture of alpha-naphthalene sulfonic acid and sodium sulfate, (2) diluting the mixture with water, and (3) recovering the improved pigment product.

2. The process of claim 1 where the salt (a) is sodium alpha-naphthalene sulfonate.

3. The process of claim 1 where step (1) is carried out in the presence of a mixture of alpha-naphthalene sulfonic acid and sodium sulfate.

4. The process of claim 1 where the crude pigment is chlorine-free copper phthalocyanine.

5. The process of claim 1 where the crude pigment is a chlorinated copper phthalocyanine.

6. The process of claim 1 wherein the crude pigment is dissolved in sulfuric acid and subsequently mixed with (the sodium) a salt of alpha-naphthalene sulfonic acid or (b) a mixture of alpha-naphthalene sulfonic acid and sodium sulfate.

7. In a process for producing organic pigments having improved heat stability and dispersibility which comprises acid pasting the crude pigment, diluting the paste with water, and recovering the pigment product, the improvement which comprises pasting the crude pigment with sulfuric acid in the presence of (a) the sodium salt of alpha-naphthalene sulfonic acid or (b) a mixture of alpha-naphthalene sulfonic acid and sodium sulfate.

8. The improvement of claim 7 wherein the ratio of the total amount of acid to the amount of crude pigment is about 5:1 to 12:1.

9. The improvement of claim 7 wherein the ratio of the total amount of acid to the amount of crude pigment is about 7:1 to 10:1.

10. The improvement of claim 7 wherein the amount of acid used in the process is about 5 to 12 parts by weight per part of the sodium salt of alpha-naphthalene sulfonic acid.

11. The improvement of claim 7 wherein the crude pigment is acid pasted in the presence of alpha-naphthalene sulfonic acid and sodium sulfate.

* * * * *